(12) United States Patent
Michalscheck

(10) Patent No.: US 9,171,305 B2
(45) Date of Patent: *Oct. 27, 2015

(54) PROVIDING CONFINED SPACE PERMITS AND CONFINED SPACE ACCESS PROCEDURES

(71) Applicant: Rockwell Automation Technologies, Inc., Mayfield Heights, OH (US)

(72) Inventor: Jimi Michalscheck, Oak Creek, WI (US)

(73) Assignee: Rockwell Automation Technologies, Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,257

(22) Filed: May 6, 2014

(65) Prior Publication Data

US 2014/0244527 A1 Aug. 28, 2014

Related U.S. Application Data

(63) Continuation-in-part of application No. 13/653,187, filed on Oct. 16, 2012, now Pat. No. 8,751,504.

(51) Int. Cl.
  *G06Q 30/00* (2012.01)
  *G06F 17/30* (2006.01)
  *H04W 64/00* (2009.01)

(52) U.S. Cl.
  CPC ........ *G06Q 30/018* (2013.01); *G06F 17/30415* (2013.01); *H04W 64/00* (2013.01)

(58) Field of Classification Search
  CPC .......... G06F 17/30575; G06F 21/6245; G06F 21/0245; G06Q 30/018; G06Q 30/0238; G06Q 50/22; G06Q 50/24; G06Q 10/06316; G06Q 30/0261; H04W 64/00; H04W 12/06; H04W 64/003; H04L 9/28; G06K 7/1456

USPC .......... 707/740, 796, 610, E17.001, E17.064, 707/E17.046; 705/317, 14.26, 14.38, 11, 705/30, 40, 29, 14.58, 14.67, 14.66, 406; 455/445, 462.08, 465.1, 406, 410; 709/224; 702/119, 120, 121, 188, 189; 435/29, 375, 287, 487; 726/25, 4

See application file for complete search history.

(56) References Cited

U.S. PATENT DOCUMENTS 6,029,144 A  2/2000 Barrett et al.
6,061,018 A  5/2000 Sheynblat
(Continued)

OTHER PUBLICATIONS

David C. Regelbrugge—"Conducting Health & Safety Audits that Protect Employees and Businesses"—ENVIRON International Corporation Chicago, IL Session No. 672—ASSE Professional Development . . . , 2011—onepetro.org—p. 1-7.*

(Continued)

*Primary Examiner* — Anh Ly
(74) *Attorney, Agent, or Firm* — Kunzler Law Group

(57) ABSTRACT

For providing confined space access procedures and confined space permits, a synchronization module stores a plurality of confined space permits and a plurality of confined space access procedures in a confined space database. Each confined space permit and each confined space access procedure corresponds to a confined space of a plurality of confined spaces and each confined space is indexed to a space reference code. The synchronization module synchronizes the plurality of confined space permits and the plurality of confined space access procedures to a mobile device. A retrieval module receives a first space reference code at the mobile device and retrieves a first confined space permit and a first confined space access procedure indexed to the first space reference code.

17 Claims, 12 Drawing Sheets

(56) References Cited

U.S. PATENT DOCUMENTS

| | | | |
|---|---|---|---|
| 6,091,738 A | 7/2000 | Tsujikado et al. | |
| 6,097,995 A * | 8/2000 | Tipton et al. | 705/28 |
| 6,370,364 B1 | 4/2002 | Liimatainen | |
| 6,453,237 B1 | 9/2002 | Fuchs et al. | |
| 6,604,014 B1 | 8/2003 | Barnett et al. | |
| 6,795,771 B2 | 9/2004 | Fuchs et al. | |
| 7,363,193 B2 * | 4/2008 | Jacobs et al. | 702/182 |
| 7,494,055 B2 | 2/2009 | Fernandes et al. | |
| 7,627,891 B2 | 12/2009 | Williams et al. | |
| 8,153,911 B2 * | 4/2012 | Turner | 705/407 |
| 8,331,955 B2 | 12/2012 | Bull et al. | |
| 8,533,075 B1 | 9/2013 | Sayers et al. | |
| 8,550,365 B1 | 10/2013 | Minvielle | |
| 8,987,613 B2 * | 3/2015 | Turner | 705/407 |
| 2001/0047283 A1 | 11/2001 | Melick et al. | |
| 2001/0047284 A1 | 11/2001 | Blalock | |
| 2002/0026339 A1 | 2/2002 | Frankland et al. | |
| 2002/0091991 A1 * | 7/2002 | Castro | 717/106 |
| 2002/0103668 A1 | 8/2002 | Ecklund et al. | |
| 2002/0152179 A1 | 10/2002 | Racov | |
| 2004/0232219 A1 | 11/2004 | Fowler | |
| 2005/0015622 A1 | 1/2005 | Williams et al. | |
| 2005/0061890 A1 | 3/2005 | Hinckley | |
| 2005/0108019 A1 | 5/2005 | Johnson | |
| 2006/0087402 A1 * | 4/2006 | Manning et al. | 340/3.1 |
| 2006/0218680 A1 | 9/2006 | Bailey | |
| 2007/0055559 A1 * | 3/2007 | Clawson | 705/8 |
| 2007/0136814 A1 | 6/2007 | Lee et al. | |
| 2007/0142939 A1 | 6/2007 | Duffy et al. | |
| 2007/0260607 A1 | 11/2007 | Hajdukiewicz et al. | |
| 2007/0269782 A1 | 11/2007 | Puente | |
| 2009/0125128 A1 | 5/2009 | Eldridge et al. | |
| 2009/0167505 A1 | 7/2009 | Ohashi et al. | |
| 2009/0204434 A1 * | 8/2009 | Breazeale, Jr. | 705/3 |
| 2009/0234690 A1 * | 9/2009 | Nikipelo | 705/7 |
| 2010/0022233 A1 | 1/2010 | Jung et al. | |
| 2010/0082389 A1 * | 4/2010 | Turner | 705/406 |
| 2010/0138566 A1 | 6/2010 | Knight | |
| 2010/0153771 A1 | 6/2010 | Gordon et al. | |
| 2010/0241465 A1 | 9/2010 | Amigo et al. | |
| 2011/0134240 A1 | 6/2011 | Anderson et al. | |
| 2011/0153358 A1 * | 6/2011 | Campo et al. | 705/2 |
| 2011/0184776 A1 * | 7/2011 | Spradling et al. | 705/7.28 |
| 2011/0208657 A1 | 8/2011 | Rao | |
| 2011/0258160 A1 * | 10/2011 | Lee et al. | 707/626 |
| 2011/0276886 A1 | 11/2011 | Hall et al. | |
| 2011/0285160 A1 | 11/2011 | Bartnick | |
| 2012/0014488 A1 | 1/2012 | Liu et al. | |
| 2012/0085829 A1 | 4/2012 | Ziegler | |
| 2012/0102543 A1 * | 4/2012 | Kohli et al. | 726/1 |
| 2012/0165037 A1 | 6/2012 | Bull et al. | |
| 2012/0166362 A1 * | 6/2012 | Turner | 705/406 |
| 2012/0259655 A1 | 10/2012 | Madreperla | |
| 2012/0310720 A1 | 12/2012 | Balsan et al. | |
| 2012/0311454 A1 | 12/2012 | Danis | |
| 2012/0320406 A1 | 12/2012 | Giannetti | |
| 2012/0329553 A1 * | 12/2012 | Gagner et al. | 463/29 |
| 2013/0032634 A1 | 2/2013 | McKirdy | |
| 2013/0087609 A1 | 4/2013 | Nichol et al. | |
| 2013/0111555 A1 | 5/2013 | Leneel | |
| 2013/0197899 A1 | 8/2013 | Roulland et al. | |
| 2013/0295941 A1 | 11/2013 | Williams | |
| 2013/0297369 A1 | 11/2013 | Shook | |
| 2013/0320407 A1 | 12/2013 | Ahn | |
| 2013/0334300 A1 | 12/2013 | Evans | |
| 2014/0040081 A1 | 2/2014 | Marwah et al. | |
| 2014/0258127 A1 | 9/2014 | Chava | |
| 2014/0269417 A1 | 9/2014 | Yu et al. | |

OTHER PUBLICATIONS

Jamil, S.; Imperial Oil Ltd. in Edmonton, Edmonton, AB, Canada; Aeiker, J.; Crow, D.—"Auditing is key"—Published in: Industry Applications Magazine, IEEE (vol. 16, Issue: 1)—Date of Publication :Jan.-Feb. 2010—Date of Current Version :Dec. 15, 2009—pp. 47-56.*

Herve Debar and Jouni Viinikka, "Intrusion Detection: Introduction to Intrusion Detection and Security Information Management", Foundations of Security Analysis and Design III—Lecture Notes in Computer Science vol. 3655, 2005, pp. 207-236.

Marius Popa, "Audit Process During Projects for Development of New Mobile IT Applications", Informatic Economica, vol. 14, No. 3, 2010, pp. 34-46.

U.S. Appl. No. 13/653,187—Notice of Allowance and Fee(s) Due, Apr. 14, 2014.

U.S. Appl. No. 14/298,657 Office Action Summary, Dec. 19, 2014.

U.S. Appl. No. 14/298,657 Office Action Summary, May 15, 2015.

S. Mitra et al., An Architecture for Regulatory Compliant Database Management, Data Engineering, 2009, ICDE '09, IEEE 25th International Conference on Mar. 29, 2009-Apr. 2, 2009.

R. Hasan, "Efficient Audit-based Compliance for Relational Data Retention", UIUC Dept. of CS Tech Report UIUCDCS-R-2009-3044, Mar. 2009, pp. 1-17.

U.S. Appl. No. 14/298,657, Notice of Allowance and Fees Due, Jul. 24, 2015.

* cited by examiner

| Auditor Data 232 | Attestation 240 |
|---|---|
| Audit Time 234 | Audit Status 242 |
| Audit Result 236 | Reference Code 205 |
| User ID 238 | Confined Space ID 225 |

PROVIDING CONFINED SPACE PERMITS AND CONFINED SPACE ACCESS PROCEDURES

CROSS-REFERENCE TO RELATED APPLICATIONS

This is a continuation-in-part application of and claims priority to U.S. patent application Ser. No. 13/653,187, now U.S. Pat. No. 8,751,504, entitled "PROVIDING PROCEDURES" and filed on Oct. 16, 2012 for Jimi Michalscheck, which is incorporated herein in its entirety by reference.

FIELD

The subject matter disclosed herein relates to permits and procedures and more particularly relates to providing confined space permits and confined space access procedures.

BACKGROUND

Description of the Related Art

Confined spaces are enclosed areas with limited access that is not organized for continuous occupation and may be dangerous to enter. Confined space permits may be required to enter a confined space. In addition, a confined space access procedure often must be followed to enter the confined space.

BRIEF SUMMARY

A method for providing confined space permits and confined space access procedures is disclosed. A synchronization module stores a plurality of confined space permits and a plurality of confined space access procedures in a confined space database. Each confined space permit and each confined space access procedure corresponds to a confined space of a plurality of confined spaces and each confined space is indexed to a space reference code. The synchronization module synchronizes the plurality of confined space permits and the plurality of confined space access procedures to a mobile device. A retrieval module receives a first space reference code at the mobile device and retrieves a first confined space permit and a first confined space access procedure indexed to the first space reference code. A program product and an apparatus also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
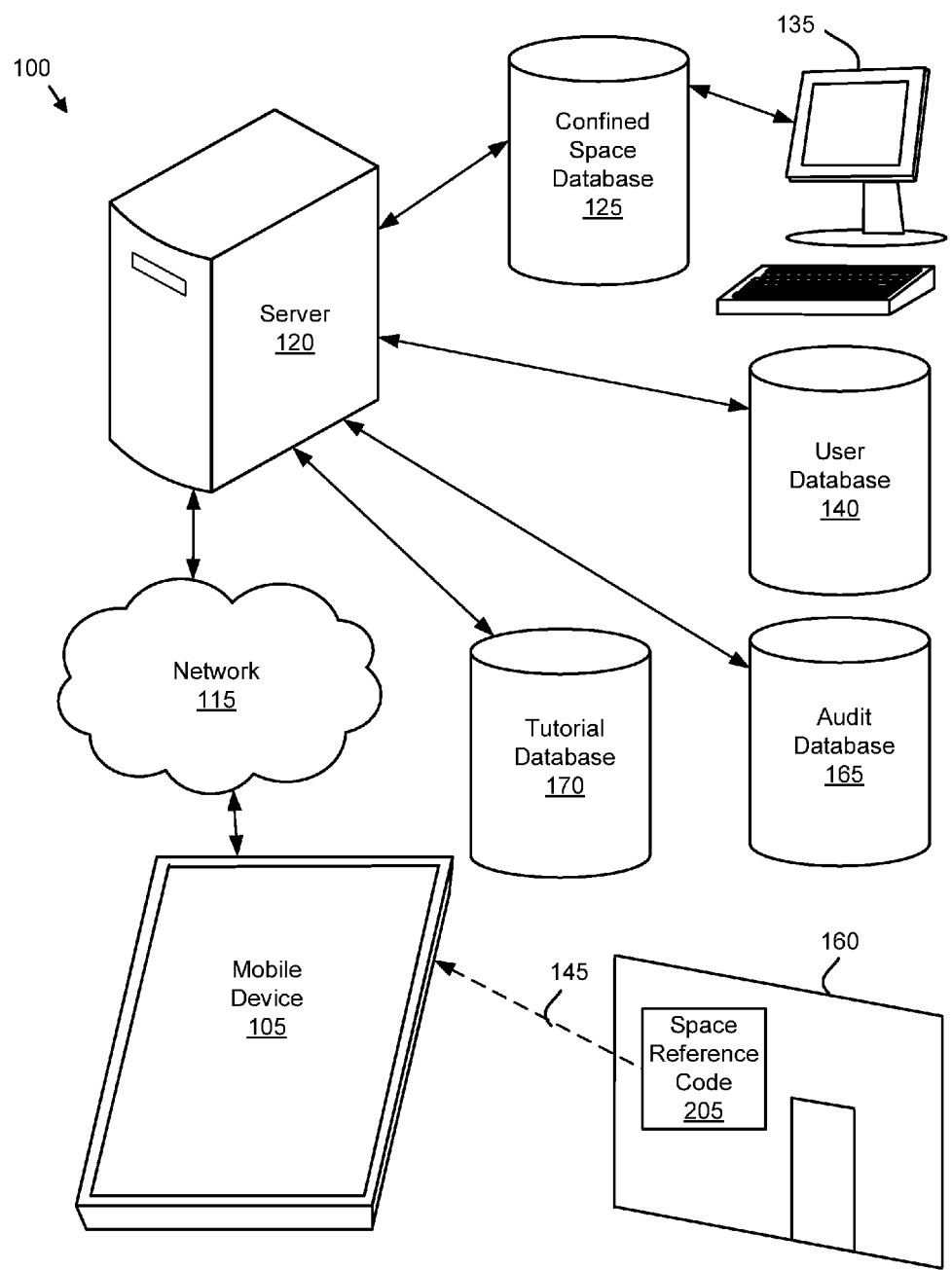
FIG. 1 is a schematic block diagram illustrating one embodiment of a system for providing confined space permits and confined space access procedures.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system 100 for providing confined space permits procedures. The system 100 provides a confined space permit and/or a confined space access procedure for a confined space 160. The system 100 includes a server 120, a confined space database 125, a user database 140, an audit database 165, a tutorial database 170, a workstation 135, a network 115, a mobile device 105, a plurality of confined spaces 160, and a space reference code 205 for each confined space 205. For simplicity, a single confined space 160 and a single space reference code 205 are shown.

The confined space 160 may be an enclosed area. In addition, the confined space 160 may not be organized for continuous and/or regular occupation. In certain embodiments, the confined space 160 may be dangerous to enter. A confined space permit may be required to enter the confined space 160. The confined space permit may specify the safety equipment, retrieval systems, pipe, line, and/or duct procedures, ventilation protocols, safety measures and the like that must be complied with when entering the confined space 160.

In addition, a confined space access procedure is often specified for safely entering the confined space 160. The confined space access procedures may specify in more detail the safety equipment, retrieval systems, pipe, line, and/or duct procedures, ventilation protocols, safety measures and the like that must be complied with when entering the confined space 160.

Unfortunately, in the past the confined space permits and the confined space access procedures have not always been available when there is a need to access the confined space 160. For example, when the confined space permits and the confined space access procedures are centrally stored, a user may need to anticipate and acquire the required confined space permits and confined space access procedures before accessing the confined space 160.

In addition, the user that had earlier acquired the required confined space permits and confined space access procedures may be unaware that a confined space permit and/or a confined space access procedure had been updated. As a result, in the past, users have often lacked the required confined space permits and confined space access procedures or did not have the latest confined space permits and confined space access procedures.

The embodiments described herein provide the most current confined space permits and confined space access procedures to the user. As a result, even when working remotely, the user is assured of having the most current confined space permits and confined space access procedures, allowing the user to conduct safe and compliant access to the confined space 160.

In order to enhance safety and comply with safety regulations, the availability and proper use of a confined space permit and/or a confined space access procedure for the confined space 160 may be periodically audited. Such an audit may be difficult to track, manage, and report. The embodiments also record if the user follows a confined space permit and/or confined space access procedure to an audit report and synchronizes the audit report to the audit database 165.

A user may be uncertain as to how to apply confined space access procedures. The embodiments also provide tutorials associated with the confined space 160. The user may access the tutorials to learn how to properly carry out steps of the confined space access procedures as will be described hereafter.

The space reference code 205 is associated with a unique confined space 160. The space reference code 205 may be affixed to an entrance of the confined space 160. Alternatively, the space reference code may be mounted near the entrance to the confined space with 160. In one embodiment, the space reference code 205 is printed on an adhesive label that is affixed to the confined space 160. The space reference code 205 may be encoded as a Quick Reference (QR) code. In addition, the space reference code 205 may also be displayed in a human readable form.

In an alternate embodiment, the space reference code 205 is encoded as a barcode. The space reference code 205 may also be encoded as an identification code broadcast via a Radio Frequency Identifier (RFID).

The space reference code 205 refers to confined space permits and confined space access procedures stored in the confined space database 125. In one embodiment, the space reference code 205 is used as an index to the confined space permits and/or confined space access procedures. The confined space permits and confined space access procedures may be created, edited, updated, and/or deleted from the workstation 135.

The server 120 may communicate the confined space permits and/or confined space access procedures through the network 115 to the mobile device 105. The network 115 may be the Internet, a cellular telephone network, a wide area network, a local area network, a wireless network, or combinations thereof.

The server 120 may synchronize all the confined space permits and/or confined space access procedures in the confined space database 125 to the mobile device 105 so that the mobile device 105 stores a copy of all the confined space permits and/or confined space access procedures in the confined space database 125. Thus all the confined space permits and/or confined space access procedures may be available on the mobile device. In addition, the server 120 may synchronize tutorials from the tutorial database 170 to the mobile device 105.

In one embodiment, the server 120 maintains a site list of all the confined spaces 160 at a specified site. The site list may include a space reference code 205 for each confined space 160 at the specified site. Alternatively, the site list may include a space identifier for each confined space 160 at the specified site. The server 120 may synchronize only the confined space permits and/or confined space access procedures of a site list to the mobile device 105 in response to receiving a space reference code 205 and/or space identifier for one of the confined spaces 160 on the site list. In one embodiment, the confined space permits and/or confined space access procedures are organized as a database, a data structure, or combinations thereof on the mobile device 105.

The mobile device 205 may be a tablet computer, a mobile phone, a notebook computer, a personal digital assistant, or the like. The mobile device 105 may receive 145 the space reference code 205. In one embodiment, the mobile device 105 optically scans a QR code and/or barcode encoding the space reference code 205. Alternatively, the mobile device 105 may optically scan a barcode encoding the space reference code 205. In a certain embodiment, the mobile device 105 wirelessly queries an RFID and receives the space reference code 205 encoded in a wireless response from the RFID.

The mobile device 105 may use the space reference code 205 as an index to retrieve the confined space permits and/or confined space access procedures indexed to the space reference code 205 from the mobile device 105. The mobile device 105 may display the confined space permit and any information associated with the confined space permit. The mobile device 105 may also display the confined space access procedure, allowing the user to perform the confined space access procedure at the confined space 160.

If the confined space permits and/or confined space access procedures associated with the space reference code 205 are not stored on the mobile device 105, the mobile device may use the space reference code 205 to request confined space permits and/or confined space access procedures from the server 120 through the network 115. The server 120 may synchronize the confined space permits and/or confined space access procedures from the confined space database 125 through the network 115 to the mobile device 105 so that the confined space permits and/or confined space access procedures may be displayed by the mobile device 105.

By synchronizing the confined space permits and/or confined space access procedures to the mobile device 105, a user may reference the correct confined space permit for the confined space 160 even if a physical copy of the confined space permit is not available locally. In addition, the user may access the correct confined space access procedure for the confined space 160 on the mobile device 105 even if a paper document with the confined space access procedure has been removed from the confined space 160 or if an incorrect confined space access procedure is placed with the confined space 160.

Figure 2A:
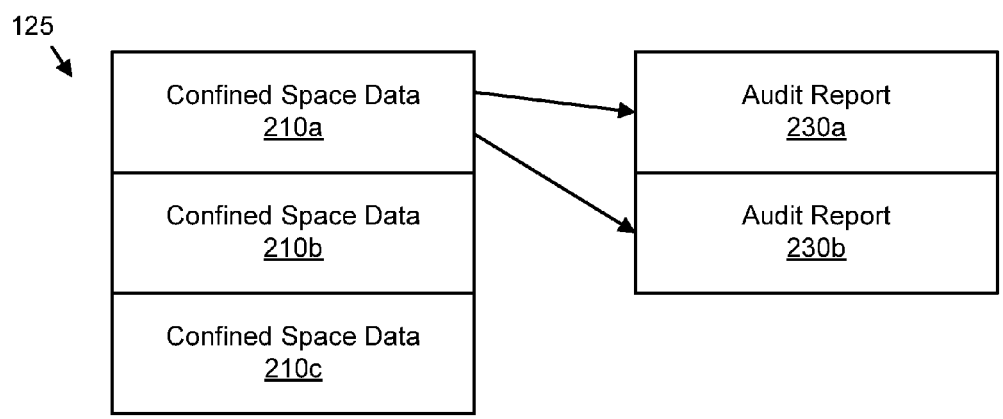
FIG. 2A is a schematic block diagram illustrating one embodiment of a confined space database.

FIG. 2A is a schematic block diagram illustrating one embodiment of a confined space database 125. The confined space database 125 is the confined space database 125 of FIG. 1. The confined space database 125 includes confined space data 210 as will be described hereafter. The confined space database 125 may include a plurality of tables, with a plurality of entries in each table. In addition, the confined space data 210 may be associated with one or more audit reports 230. In one embodiment, the audit reports 230 are stored in the audit database 165 as will be described hereafter.

Figure 2B:
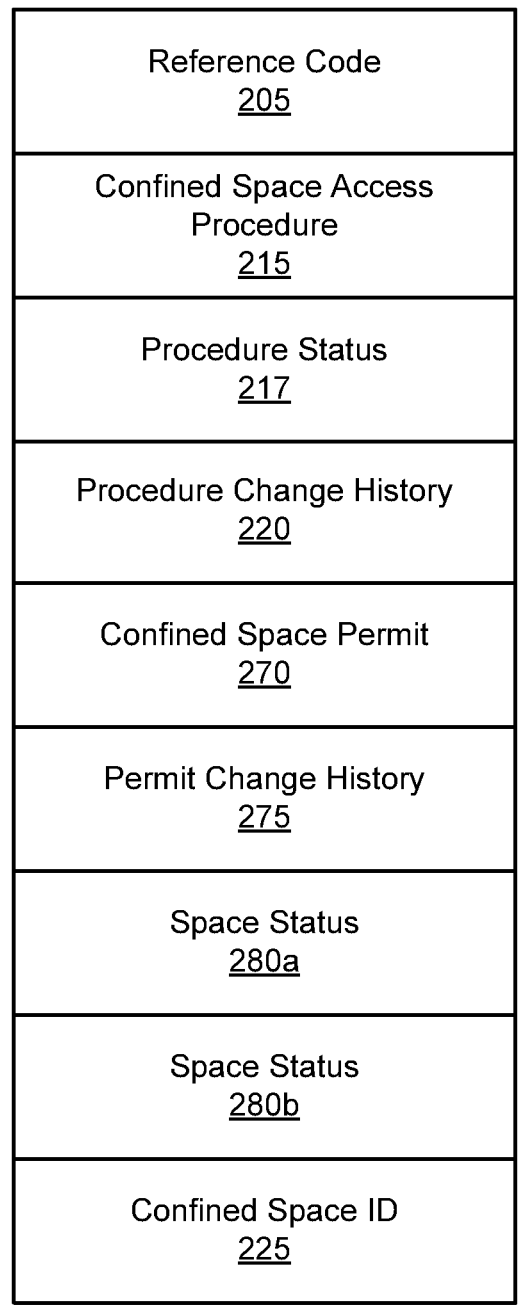
FIG. 2B is a schematic block diagram illustrating one embodiment of confined space data.

FIG. 2B is a schematic block diagram illustrating one embodiment of the confined space data 210. The confined space data 210 is the confined space data 210 of FIG. 2A. The confined space data 210 may include a plurality of segments. The segments may be stored in one or more tables. The segments may include the space reference code 205, a confined space access procedure 215, a procedure status 217, a procedure change history 220, a confined space permit 270, a permit change history 275, one or more space statuses 280, and a confined space identifier 225. The space reference code 205 may index the confined space data 210. In addition, the space reference code 205 may identify the confined space 160.

The confined space access procedure 215 may include instructions in text, hypertext, audio, video, images, and combinations thereof. The confined space access procedure 215 may be displayed and/or transmitted to allow the user to perform one or more operations in the confined space 160. For example, the confined space access procedure 215 may specify safety equipment, may specify operations for accessing the confined space 160, may specify operations for maintaining a safe environment within the confined space 160, and may specify actions to be performed while in the confined space 160. In a certain embodiment, the confined space access procedure 215 includes a contact link that connects the user to an expert or service personnel. The procedure status 217 may indicate that a space reference code 205 is unassigned, that an audit is passed, failed, and/or that the audit is complete.

The procedure change history 220 may record changes to the confined space access procedure 215. In one embodiment, changes are recorded to the procedure change history 220 automatically when the changes are made. For example, the user may be prompted to enter a description of the change. Alternatively, the changes may be recorded from comparisons of different versions of the confined space access procedure 215.

The confined space permit 270 may specify acceptable entry conditions for the confined space 160, requirements for an attendant stationed outside the confined space 160, an authorized entrant, closures of pipes, lines, and/or ducts, the breaking of pipes, lines, and/or ducts, the bleeding of pipes, lines, and/or ducts, authorizations for performing hot work, requirements for ventilating and/or making inert the atmosphere of the confined space 160, requirements for isolating the confined space 160, required retrieval systems, and test procedures.

The permit change history 275 may record changes to the confined space permit 270. The changes to the confined space permit 270 may be recorded automatically when the changes are made, such as by prompting for a description of the changes. In one embodiment, the changes to the confined space permit 270 are manually entered from the workstation 135. In addition, the changes may be determined from a comparison of different versions of the confined space permit 270.

The space status 280 may record specific status information about the confined space 160. The space status 280 is described in more detail hereafter in FIG. 2C. The confined space identifier 225 may include a unique identifier such as architectural drawing reference numbers for one or more confined spaces 160. The confined space identifier 225 may also be used index the confined space data 210 in the confined space database 125.

Figure 2C:
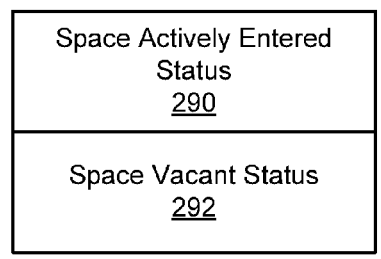
FIG. 2C is a schematic block diagram illustrating one embodiment of a space status.

FIG. 2C is a schematic block diagram illustrating one embodiment of a space status 280. The space status 280 is the space status 280 of FIG. 2B. In the depicted embodiment, the space status 280 includes a space actively entered status 290 and the space vacant status 292. The space actively entered status 290 may indicate that the confined space 160 has been actively entered. The space vacant status 292 may indicate that the confined space 160 is vacant.

Figure 2D:
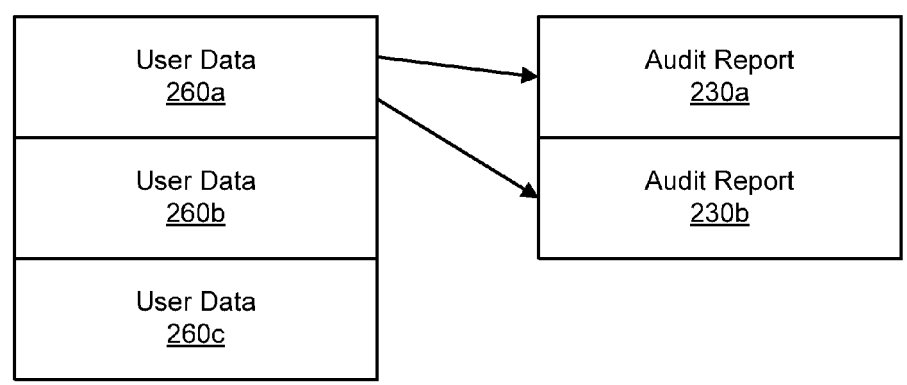
FIG. 2D is a schematic block diagram illustrating one embodiment of a user database 140.

FIG. 2D is a schematic block diagram illustrating one embodiment of a user database 140. The user database 140 is the user database 140 of FIG. 1. The user database 140 may be organized as a plurality of tables. The user database 140 includes user data 260. The user data 260 may include a user name, a user identifier such as employee number, a user image, a biometric identifier, a signature, and the like. In one embodiment, one or more audit reports 230 are associated with the user data 260.

Figures 2E, 2F:
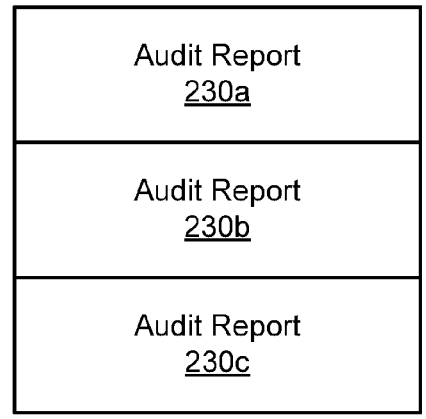
FIG. 2E is a schematic block diagram illustrating one embodiment of an audit database 165.
FIG. 2F is a schematic block diagram illustrating one embodiment of an audit report.

FIG. 2E is a schematic block diagram illustrating one embodiment of an audit database 165. The audit database 165 is the audit database 165 of FIG. 1. The audit database 165 may store a plurality of audit reports 230 has will be described hereafter in FIG. 2F.

FIG. 2F is a schematic block diagram illustrating one embodiment of an audit report 230. The audit report 230 is the audit report 230 of FIGS. 2A, 2D, and 2E. The audit report 230 may be embodied in one or more tables, a data structure, and the like. The audit report 230 includes auditor data 232, an audit time 234, audit results 236, the user identifier 238, an attestation 240, an audit status 242, the space reference code 205, and/or the confined space identifier 225.

The auditor data 232 may identify an auditor performing the audit. In one embodiment, the auditor is identified as the individual logging into the mobile device 105 to perform the audit. In one embodiment, the auditor may login to the mobile device 105 and select an audit option. An identifier for the auditor may be stored with the auditor data 232. The audit time 234 may be a timestamp indicating when the audit was completed.

The audit result 236 may describe the results of the audit. The audit results 236 may include a data structure encoding results of the audit, hypertext encoding results of the audit, a written description of results of the audit, a verbal description of results of the audit, and a video description of results of the audit, and combinations thereof. The audit status 242 may summarize the audit such as with a pass/fail indication.

In one embodiment, the user identifier 238 identifies the user performing operations at the confined space 160. The user identifier 238 may refer to the user data 260. The space reference code 205 is the space reference code 205 of FIG. 1. The confined space identifier 225 is the confined space identifier 225 of the confined space 160.

The mobile device 105 may scan the space reference code 205 to identify the confined space data 210. The module device 105 may further scan an employee badge of the user to capture the user identifier 238. The mobile device 105 may also scan the confined space identifier 225 of the confined space 160.

The auditor may observe the user complying with the requirements of the confined space permit 270. In addition, the auditor may observe the user performing the confined space access procedure 215 associated with the space reference code 205. The results of the audit are stored in the audit result 236 as will be described hereafter.

Figure 2G:
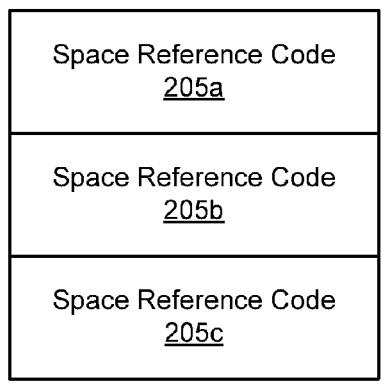
FIG. 2G is a schematic block diagram illustrating one embodiment of a site list.
Figure 2H:
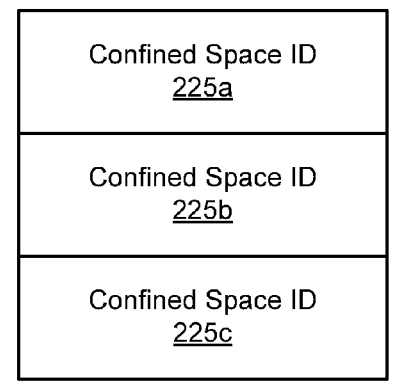
FIG. 2H is a schematic block diagram illustrating one alternate embodiment of the site list.

FIGS. 2G and 2H are a schematic block diagrams illustrating embodiments of sites lists 260. In one embodiment, a first site list 260a lists the space reference codes 205 of confined spaces 160 at the specified site. Alternatively, a second site list 260b lists the space identifiers 225 of confined spaces 160 at the specified site. The site list 260 may be used to determine which confined space permits 270 and/or confined space access procedures 210 are synchronized from the confined space database 125 to the mobile device 105.

Figure 2I:
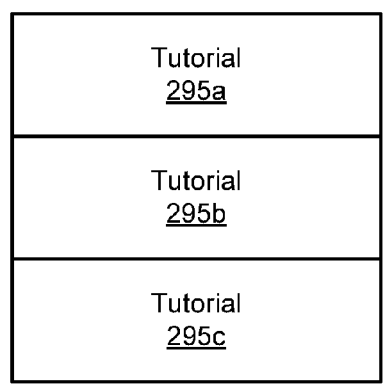
FIG. 2I is a schematic block diagram illustrating one embodiment of a tutorial database.

FIG. 2I is a schematic block diagram illustrating one embodiment of a tutorial database 170. This tutorial database 170 as its tutorial database 170 of FIG. 1. The tutorial database 170 stores a plurality of tutorials 295. Each of the tutorials 295 may include one or more of text instructions, hypertext instructions, audio instructions, video instructions, image instructions, and the like for performing one or more operations. The operations may be specific to a confined space 160. Alternatively, the operations may be appropriate for multiple similar confined spaces 160.

Figure 3A:
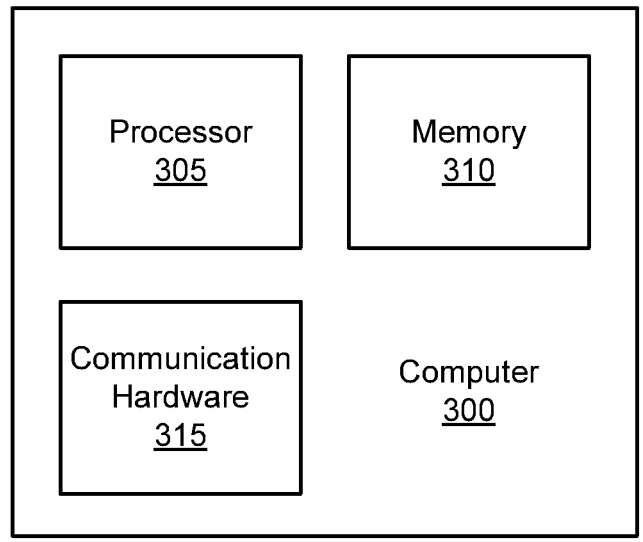
FIG. 3A is a schematic block diagram illustrating one embodiment of a computer.

FIG. 3A is a schematic block diagram illustrating one embodiment of the computer 300. The computer 300 may be the server 120 of FIG. 1. Alternatively, the computer 300 may be the mobile device 105 and/or the workstation 135 of FIG. 1. The computer 300 includes a processor 305, a memory 310, and communication hardware 315. The memory 310 may be a computer readable storage medium such as a semiconductor storage device, a hard disk drive, an optical drive, a holographic storage device, a micromechanical storage device, or combinations thereof. The memory 310 may store program code. The processor 305 may execute the program code. The communication hardware 315 may communicate with other devices.

Figure 3B:
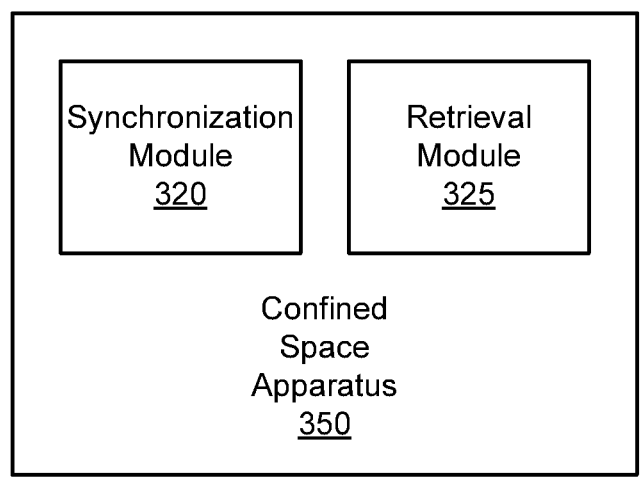
FIG. 3B is a schematic block diagram illustrating one embodiment of a confined space apparatus.

FIG. 3B is a schematic block diagram illustrating one embodiment of the procedure apparatus 350. The apparatus 350 may be embodied in the computer 300. In one embodiment, the apparatus 350 is embodied in the server 120, the mobile device 105, or combinations thereof. The apparatus 350 includes a synchronization module 320 and a retrieval module 325. The synchronization module 320 and the retrieval module 325 may be embodied in a computer readable storage medium such as the memory 310 storing program code that is executed by the processor 305.

The synchronization module 320 stores a plurality of confined space access procedures 210 and confined space permits 270 in the confined space database 125. In addition, the synchronization module 320 synchronizes the plurality of confined space access procedures 210 and confined space permits 270 to the mobile device 105.

The retrieval module 325 may receive the space reference code 205 at the mobile device 105. In addition, the retrieval module 325 may retrieve the confined space access procedure 215 and confined space permit 270 indexed to the space reference code 205. Additional functions of the apparatus 350 are described hereafter.

Figure 4A:
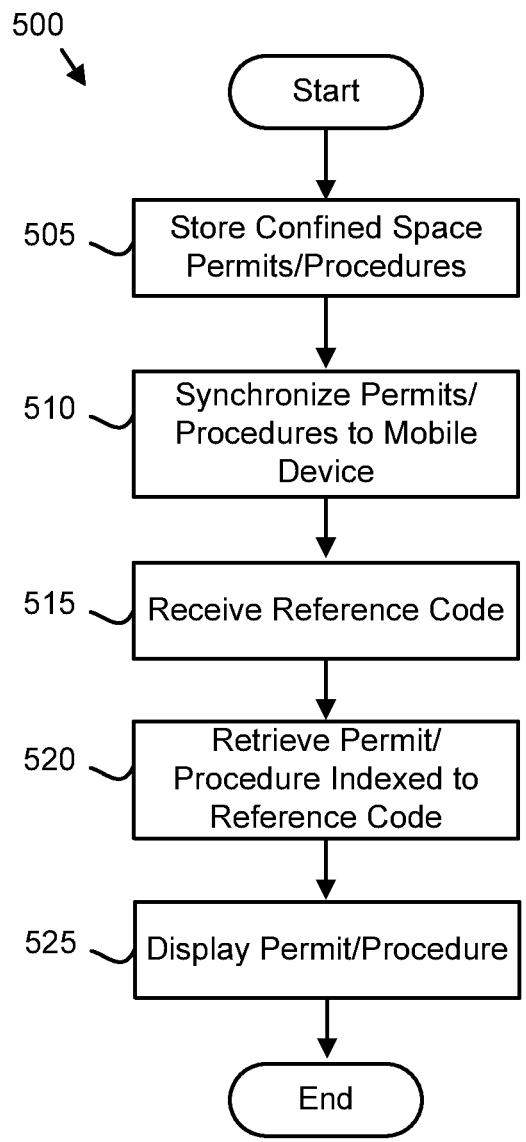
FIG. 4A is a schematic flow chart diagram illustrating one embodiment of a confined space permit and confined space access procedure provision method.

FIG. 4A is a schematic flow chart diagram illustrating one embodiment of a confined space permit and confined space access procedure provision method 500. The method 500 may provide a confined space permit 270 and/or a confined space access procedure 215. The method 500 may perform the functions of the system 100 and apparatus 350. In one embodiment, the method 500 is performed by a computer readable storage medium such as the memory 310 storing program code. The program code may be executed by the processor 305 to perform the functions of the method 500.

The method 500 starts, and in one embodiment the synchronization module 320 stores 505 a plurality of confined space access procedures 210 and a plurality of confined space permits 270 in a confined space database 125. Each confined space access procedure 215 and confined space permit 270 may be indexed with a space reference code 205. Alternatively, each confined space access procedure 215 and confined space permit 270 may be indexed with a confined space identifier 225.

The synchronization module 320 may synchronize 510 a confined space access procedure 215 and/or confined space permit 270 from the confined space database 125 to the mobile device 105. In one embodiment, all confined space access procedures 210 and/or confined space permits 270 are synchronized from the confined space database 125 to the mobile device 105. In an alternative embodiment, only confined space access procedures 210 and/or confined space permits 270 with space reference codes 205 and/or confined space identifiers 225 of a site list 260 are synchronized 510 to the mobile device 105. The site list 260 may include at least one space reference code 205 and/or confined space identifier 225 that is received by the mobile device 105. In one embodiment, the confined space access procedures 210 and/or confined space permits 270 are synchronized when the mobile device 105 is in communication with the network 115.

The retrieval module 325 receives 515 the space reference code 205. In one embodiment, the retrieval module 325 embodied in the mobile device 105 and scans a QR code space reference code 205 affixed to the confined space 160. Alternatively, the retrieval module 325 may receive 515 the space reference code 205 by scanning a barcode, receiving the space reference code 205 wirelessly, and/or by scanning human readable text. The retrieval module 325 may convert the scanned QR code, the scanned barcode, the human readable text, and/or the received space reference code 205 into a digital string.

The retrieval module 325 may retrieve 520 the confined space access procedure 215 and/or confined space permit 270 corresponding to the space reference code 205 that is stored on the mobile device 105. In one embodiment, the retrieval module 325 uses the retrieval code 205 is an index to access the confined space access procedure 215 and/or confined space permit 270. In one embodiment, if the confined space access procedure 215 and/or confined space permit 270 corresponding to the space reference code 205 is not stored on a mobile device 105, the retrieval module 325 may use the space reference code 205 to request the confined space access procedure 215 and/or confined space permit 270 from the server 120 over the network 115.

The confined space access procedure 215 and/or confined space permit 270 may be displayed 525 on the mobile device 105 and the method 500 ends. Alternatively, the confined space access procedure 215 and/or confined space permit 270 may be communicated to a second device. In one embodiment, actions taken by the user are recorded to the audit report 230.

Figure 4B:
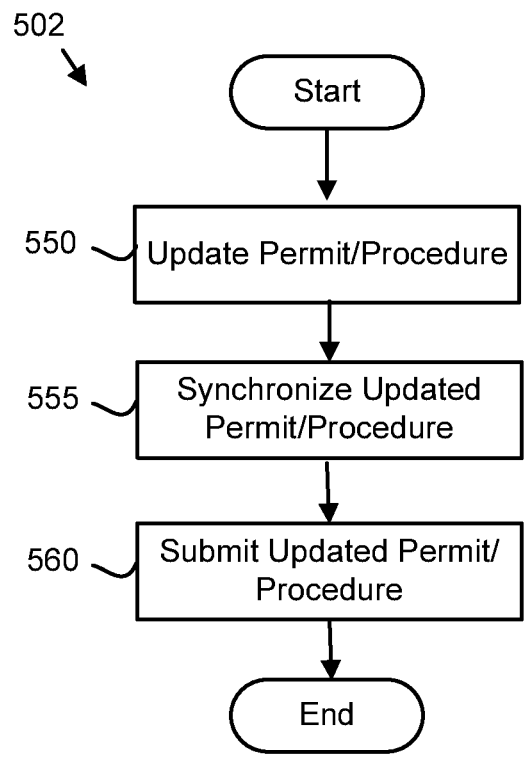
FIG. 4B is a schematic flow chart diagram illustrating one embodiment of an update method.

FIG. 4B is a schematic flowchart diagram illustrating one embodiment of an update method 502. The method 502 may update a confined space permit 270 and/or a confined space access procedure 215. The method 502 may perform the functions of the system 100 and apparatus 350. In one embodiment, the method 502 is performed by a computer readable storage medium such as the memory 310 storing program code. The program code may be executed by the processor 305 to perform the functions of the method 502.

The method 502 starts, and in one embodiment, the retrieval module 325 updates 550 a confined space access procedure 215 and/or confined space permit 270. The update may be entered by a user. The synchronization module 320 may synchronize 555 the updated confined space access procedure 215 and/or updated confined space permit 270 to the confined space database 125. In one embodiment, the updated confined space access procedure 215 and/or updated confined space permit 270 may overwrite a previous confined space access procedure 215 and/or a previous confined space permit 270. Alternatively, the updated confined space access procedure 215 and/or updated confined space permit 270 may be appended to the confined space database 125.

In one embodiment, the server 120 may submit 560 the updated confined space access procedure 215 and/or updated confined space permit 270 to a regulatory authority such as the Occupational Safety and Health Administration and the method 502 ends. In one embodiment, the updated confined space access procedure 215 and/or updated confined space permit 270 are submitted as extended markup language files.

Figure 4C:
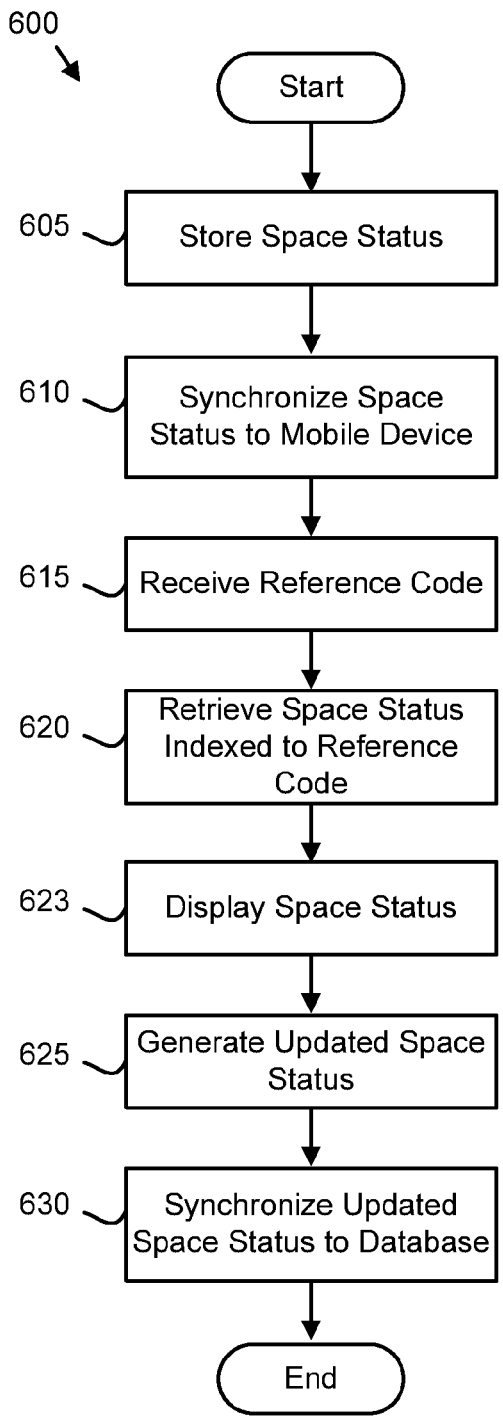
FIG. 4C is a schematic flow chart diagram illustrating one embodiment of a space status provision method.

FIG. 4C is a schematic flow chart diagram illustrating one embodiment of a space status provision method 600. The method 600 may provide and/or update a space status 280. The method 600 may perform the functions of the system 100 and apparatus 350. In one embodiment, the method 600 is performed by a computer readable storage medium such as the memory 310 storing program code. The program code may be executed by the processor 305 to perform the functions of the method 600.

The method 600 starts, and in one embodiment the synchronization module 320 stores 605 a plurality of space statuses 280 in a confined space database 125. Each space status 280 may be stored as part of confined space data 210.

The synchronization module 320 may synchronize 610 a space status 280 from the confined space database 125 to the mobile device 105. In one embodiment, all space statuses 280 are synchronized 610 from the confined space database 125 to the mobile device 105. In an alternative embodiment, only space statuses 280 corresponding to space reference codes 205 and/or confined space identifiers 225 of a site list 260 are synchronized 610 to the mobile device 105. In one embodiment, the space statuses 280 are synchronized 610 when the mobile device 105 is in communication with the network 115.

The retrieval module 325 receives 615 the space reference code 205. In one embodiment, the retrieval module 325 embodied in the mobile device 105 scans a QR code space reference code 205 affixed to the confined space 160. Alternatively, the retrieval module 325 may receive 615 the space reference code 205 by scanning a barcode, receiving the space reference code 205 wirelessly, or by scanning human readable text. The retrieval module 325 may convert the scanned QR code, the scanned barcode, the human readable text, and/or the received space reference code 205 into a digital string.

The retrieval module 325 may retrieve 620 the space status 280 corresponding to the space reference code 205 that is stored on the mobile device 105. In one embodiment, the retrieval module 325 uses the retrieval code 205 is an index to access the space status 280. If the space status 280 corresponding to the space reference code 205 is not stored on a mobile device 105, the retrieval module 325 may use the space reference code 205 to request the space status 280 from the server 120 over the network 115. The space status 280 may be displayed 623 on the mobile device 105. Alternatively, the space status 280 may be communicated to a second device.

The retrieval module 325 may generate 625 an update of the space status 280. The user may enter the update on the mobile device 105. Alternatively, the update may be generated 625 in response to the user indicating that a portion of the confined space access procedure 215 is completed. In one embodiment, the update to the space status 280 may be generated 625 from the audit report 230.

The synchronization module 320 may synchronize 630 the updated space status 280 to the confined space database 125 and the method 600 ends. In one embodiment, the updated space status 280 overwrites a previous space status 280 in the confined space database 125. Alternatively, the updated space status 280 is appended to the confined space database 125.

Figure 4D:
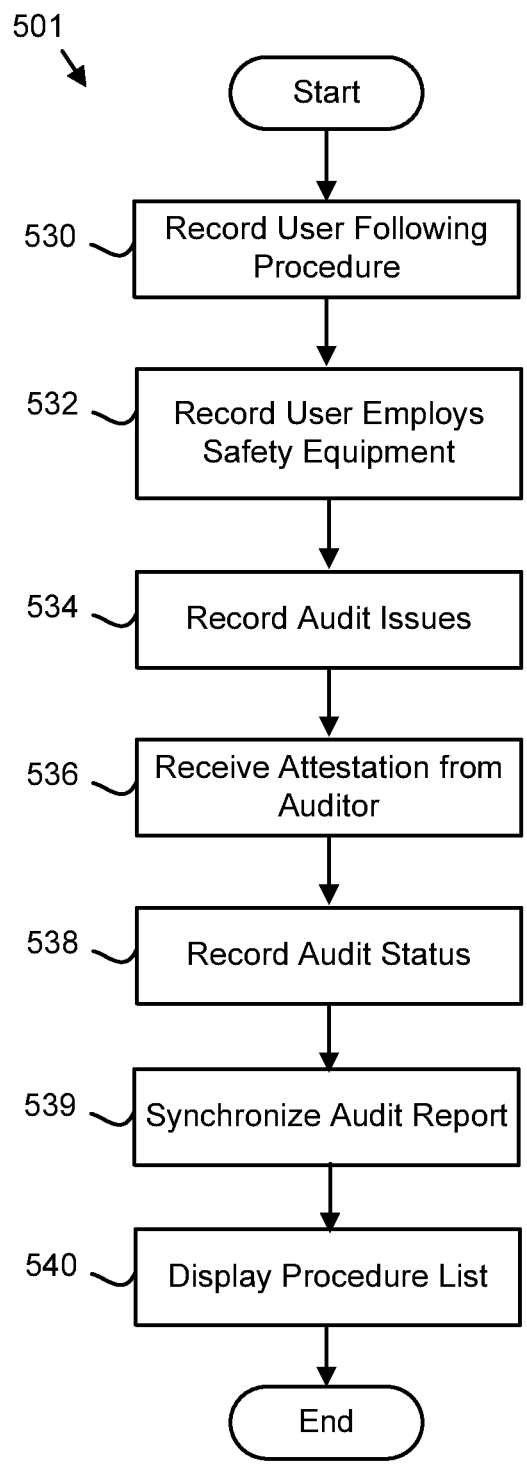
FIG. 4D is a schematic flow chart diagram illustrating one embodiment of an audit method.

FIG. 4D is a schematic flowchart diagram illustrating one embodiment of an audit method 501. The method 501 may audit performance of a confined space access procedure 215. The method 501 may perform the functions of the system 100 and apparatus 350. In one embodiment, the method 501 is performed by a computer readable storage medium such as the memory 310 storing program code. The program code may be executed by the processor 305 to perform the functions of the method 501.

The method 501 starts, and in one embodiment the retrieval module 325 records 530 a user following and/or performing a confined space access procedure 215. The retrieval module 325 may record 530 the following of the confined space access procedure 215 to the audit result 236 of an audit report 230. The retrieval module 325 may further record 530 the individual performing the audit to the auditor data 232.

In one embodiment, the retrieval module 325 records 532 if the user employs safety equipment specified by the confined space access procedure 215 and/or confined space permit 270 to the audit result 236. For example, the confined space access procedure 215 may specify the use of safety equipment, retrieval equipment, or the like. The retrieval module 325 may record 532 if the specified safety equipment is used as part of the confined space access procedure 215.

The retrieval module 325 may record 534 audit issues for the confined space access procedure 215 and/or confined space permit 270 to the audit results 236. The audit issues may include that the confined space 160 is incorrectly marked, that the confined space 160 lacks the required safety equipment, that the confined space 160 was improperly ventilated, that the confined space 160 lacks a physical copy of the confined space access procedure 215 and/or confined space permit 270, that the steps of the confined space access procedure 215 and/or confined space permit 270 were incorrectly followed, that the user was improperly trained, and the like.

In one embodiment, the retrieval module 325 records 536 an attestation from the auditor. The attestation may be an electronic signature, a biometric identifier, the signature image, or combinations thereof. The retrieval module 325 may further record 538 an audit status 242 that may indicate if the confined space access procedure 215, confined space 160, user, or combinations thereof passed the audit.

The synchronization module 320 may synchronize 539 the audit report 230 to the audit database 165. The audit report 230 may be associated with the confined space data 210. In addition, the synchronization module 320 may associate the audit report 230 to the user database 140 and associate the audit report 230 with the user data 260 of the user.

In one embodiment, the retrieval module 325 displays 540 a procedure list of the plurality of procedures 210 and the method 501 ends. The procedure list may be displayed 540 on the workstation 135 and/or on the mobile device 105. The procedure list may include a procedure status 217 for a confined space 160 including the confined space data 210. The procedure status 217 may indicate that a space reference code 205 is unassigned, that an audit is passed, failed, and/or that the audit is complete.

In one embodiment, the retrieval module 325 displays 540 a summary the audit status for all confined spaces 160. Alternatively, the retrieval module 325 displays 540 a summary of the audit status for all users. The summary of the audit status may be used to show compliance with one or more regulations.

Figure 4E:
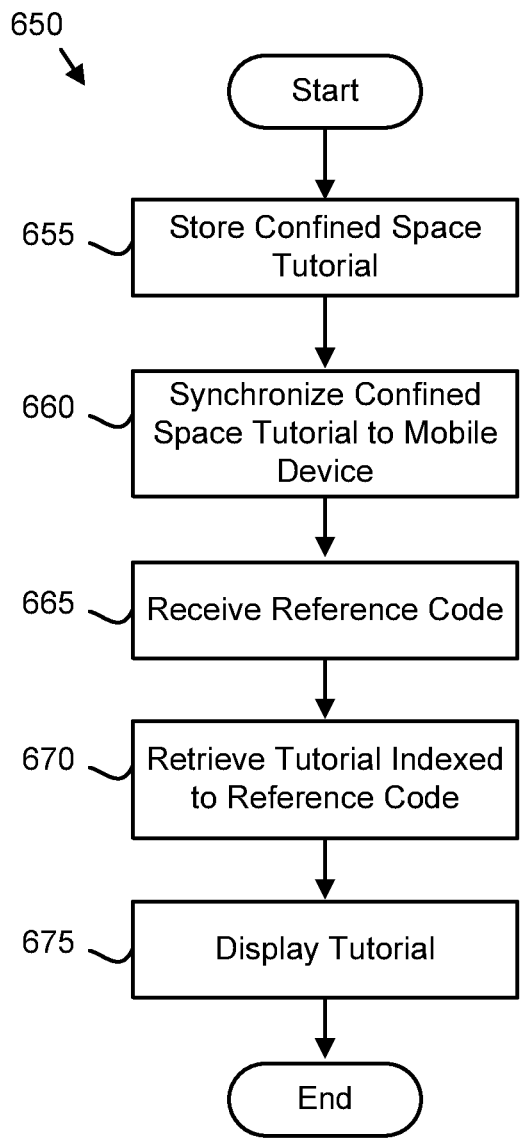
FIG. 4E is a schematic flow chart diagram illustrating one embodiment of a tutorial provision method.

FIG. 4E is a schematic flow chart diagram illustrating one embodiment of a tutorial provision method 650. The method 650 may provide tutorials 295 for a confined space access procedure 215 and/or confined space permit 270. The method 650 may perform the functions of the system 100 and apparatus 350. In one embodiment, the method 650 is performed by a computer readable storage medium such as the memory 310 storing program code. The program code may be executed by the processor 305 to perform the functions of the method 650.

The method 650 starts, and in one embodiment the synchronization module 320 stores 655 a plurality of tutorials 295 in the tutorial database 170. Each tutorial 295 may be indexed with a space reference code 205. Alternatively, each tutorial 295 may be indexed with a confined space identifier 225.

The synchronization module 320 may synchronize 660 a confined tutorial 295 from the confined space database 125 to the mobile device 105. In one embodiment, all tutorials 295 are synchronized from the confined space database 125 to the mobile device 105. In an alternative embodiment, only tutorial 295 corresponding to space reference codes 205 and/or space identifiers 225 of a site list 260 are synchronized 510 to the mobile device 105. In one embodiment, the tutorial 295 are synchronized when the mobile device 105 is in communication with the network 115.

The retrieval module 325 receives 665 the space reference code 205. In one embodiment, the retrieval module 325 embodied in the mobile device 105 scans a QR code space reference code 205 affixed to the confined space 160. Alternatively, the retrieval module 325 may receive 665 the space reference code 205 by scanning a barcode, receiving the space reference code 205 wirelessly, or by scanning human readable text. The retrieval module 325 may convert the scanned QR code, the scanned barcode, the human readable text, and/or the received space reference code 205 into a digital string.

The retrieval module 325 may retrieve 670 the tutorial 295 corresponding to the retrieval code 205 that is stored on the mobile device 105. In one embodiment, the retrieval module 325 uses the retrieval code 205 is an index to access the tutorial 295. In one embodiment, if the tutorial 295 corresponding to the space reference code 205 is not stored on a mobile device 105, the retrieval module 325 may use the space reference code 205 to request the tutorial 295 from the server 120 over the network 115.

The tutorial 295 may be displayed 675 on the mobile device 105 and the method 650 ends. Alternatively, the tutorial 295 may be communicated to a second device. In one embodiment, the review of the tutorial 295 by the user is recorded to the audit report 230.

The embodiments store confined space permits 270 and confined space access procedures 215 and synchronize the confined space permits 270 and confined space access procedures 215 to the mobile device 105. The confined space permits 270 and confined space access procedures 215 may then be retrieved using a space reference code 205 so that the latest confined space permits 270 and confined space access procedures 215 are always accessible to users at the confined space 160.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing procedures comprising:

storing, by use of a processor, a plurality of confined space permits and a plurality of confined space access procedures in a confined space database, wherein each confined space permit and each confined space access procedure corresponds to a confined space of a plurality of confined spaces, a corresponding confined space permit is required to enter each confined space, and each confined space is indexed to a space reference code that uniquely identifies the confined space;

synchronizing the plurality of confined space permits and the plurality of confined space access procedures to a mobile device;

receiving a first space reference code at the mobile device, wherein the first space reference code is affixed to a first confined space;

retrieving a first confined space permit and a first confined space access procedure indexed to the first space reference code;

synchronizing an audit report recording if a user follows the first confined space access procedure from the mobile device to an audit database, wherein the audit report is linked to the first confined space access procedure in a confined space database and to user data for the user in a user database; and automatically displaying the audit report linked to the first confined space in response to displaying a procedure status for the first confined space access procedure of the plurality of confined space access procedures and displaying an audit report audit status for the user.

2. The method of claim 1, the method further comprising:
updating one or more of the first confined space permit and the first confined space access procedure at the mobile device;
synchronizing the one or more the updated first confined space permit and the first confined space access procedure from the mobile device to the confined space database; and
submitting the one or more the updated first confined space permit and the first confined space access procedure to a regulatory authority.

3. The method of claim 1, the method further comprising:
storing a plurality of space statuses for each confined space of the plurality of confined spaces;
synchronizing the plurality of space statuses to the mobile device;
generating an update to a first space status at the mobile device; and
synchronizing the updated first space status from the mobile device to the confined space database.

4. The method of claim 3, wherein each space status comprises a space actively entered status and a space vacant status.

5. The method of claim 1, the method further comprising:
recording audit issues for the first confined space access procedure to the audit report;
recording an attestation from an auditor to the audit report; and
recording an audit result to the audit report.

6. The method of claim 1, the audit report comprising an auditor, the user, an audit time, an audit status, and the space reference code.

7. The method of claim 1, the method further comprising
storing a plurality of confined space tutorials in a tutorial database;
synchronizing the plurality of confined space tutorials to the mobile device; and
retrieving a first tutorial in response to the first space reference code.

8. The method of claim 1, wherein the first space reference code is encoded as a Quick Response (QR) code.

9. The method of claim 1, wherein the first space reference code is encoded as a barcode.

10. The method of claim 1, wherein the first space reference code is encoded as an identification code of a Radio Frequency Identifier (RFID).

11. The method of claim 1, wherein the confined space permits and the confined space access procedures are grouped by site and the method further comprising presenting the confined space permits and confined space access procedures grouped to a first site in response to the first space reference code corresponding to the first site.

12. The method of claim 1, further comprising maintaining a site list of space reference codes for a specified site and synchronizing only confined space access procedures and confined space permits with space reference codes that match at least one space reference code of the site list.

13. The method of claim 1, wherein the procedure status for each confined space access procedure is selected from space reference code unassigned, audit incomplete, and audit complete.

14. A program product comprising a non-transitory computer readable storage medium that stores program code executable by a processor to perform:
storing a plurality of confined space permits and a plurality of confined space access procedures in a confined space database, wherein each confined space permit and each confined space access procedure corresponds to a confined space of a plurality of confined spaces, a corresponding confined space permit is required to enter each confined space, and each confined space is indexed to a space reference code that uniquely identifies the confined space;
synchronizing the plurality of confined space permits and the plurality of confined space access procedures to a mobile device;
receiving a first space reference code at the mobile device, wherein the first space reference code is affixed to a first confined space;
retrieving a first confined space permit and a first confined space access procedure indexed to the first space reference code;
synchronizing an audit report recording if a user follows the first confined space access procedure from the mobile device to an audit database, wherein the audit report is linked to the first confined space access procedure in a confined space database and to user data for the user in a user database; and
automatically displaying the audit report linked to the first confined space in response to displaying a procedure status for the first confined space access procedure of the plurality of confined space access procedures and displaying an audit report audit status for the user.

15. The program product of claim 14, the method further comprising:
updating one or more of the first confined space permit and the first confined space access procedure at the mobile device;
synchronizing the one or more the updated first confined space permit and the first confined space access procedure from the mobile device to the confined space database; and
submitting the one or more the updated first confined space permit and the first confined space access procedure to a regulatory authority.

16. The program product of claim 14, the method further comprising:
storing a plurality of space statuses for each specified confined space of the plurality of confined spaces;
synchronizing the plurality of space statuses to the mobile device;
generating an update to a first space status at the mobile device; and
synchronizing the updated first space status from the mobile device to the confined space database.

17. An apparatus comprising:
a processor;
a non-transitory computer readable storage medium storing program code executable by the processor, the program code comprising:
a synchronization module that stores a plurality of confined space permits and a plurality of confined space access procedures in a confined space database, wherein each confined space permit and each confined space access procedure corresponds to a confined space of a plurality of confined spaces, a corresponding confined space permit is required to enter each confined space, and each confined space is indexed to a space reference code that uniquely identifies the confined space and synchronizes the plurality of confined space permits and the plurality of confined space access procedures to a mobile device;
a retrieval module that receives a first space reference code at the mobile device, wherein the first space reference code is affixed to a first confined space and retrieves a first confined space permit and a first confined space access procedure indexed to the first space reference code;

the synchronization module synchronizing an audit report recording if a user follows the first confined space access procedure from the mobile device to an audit database, wherein the audit report is linked to the first confined space access procedure in a confined space database and to user data for the user in a user database; and the retrieval module automatically displaying the audit report linked to the first confined space in response to displaying a procedure status for the first confined space access procedure of the plurality of confined space access procedures and displaying an audit report audit status for the user.

* * * * *